June 29, 1937.  E. M. GODFREY, JR  2,085,650
TIRE BUFFING STAND
Filed May 27, 1935  2 Sheets-Sheet 1
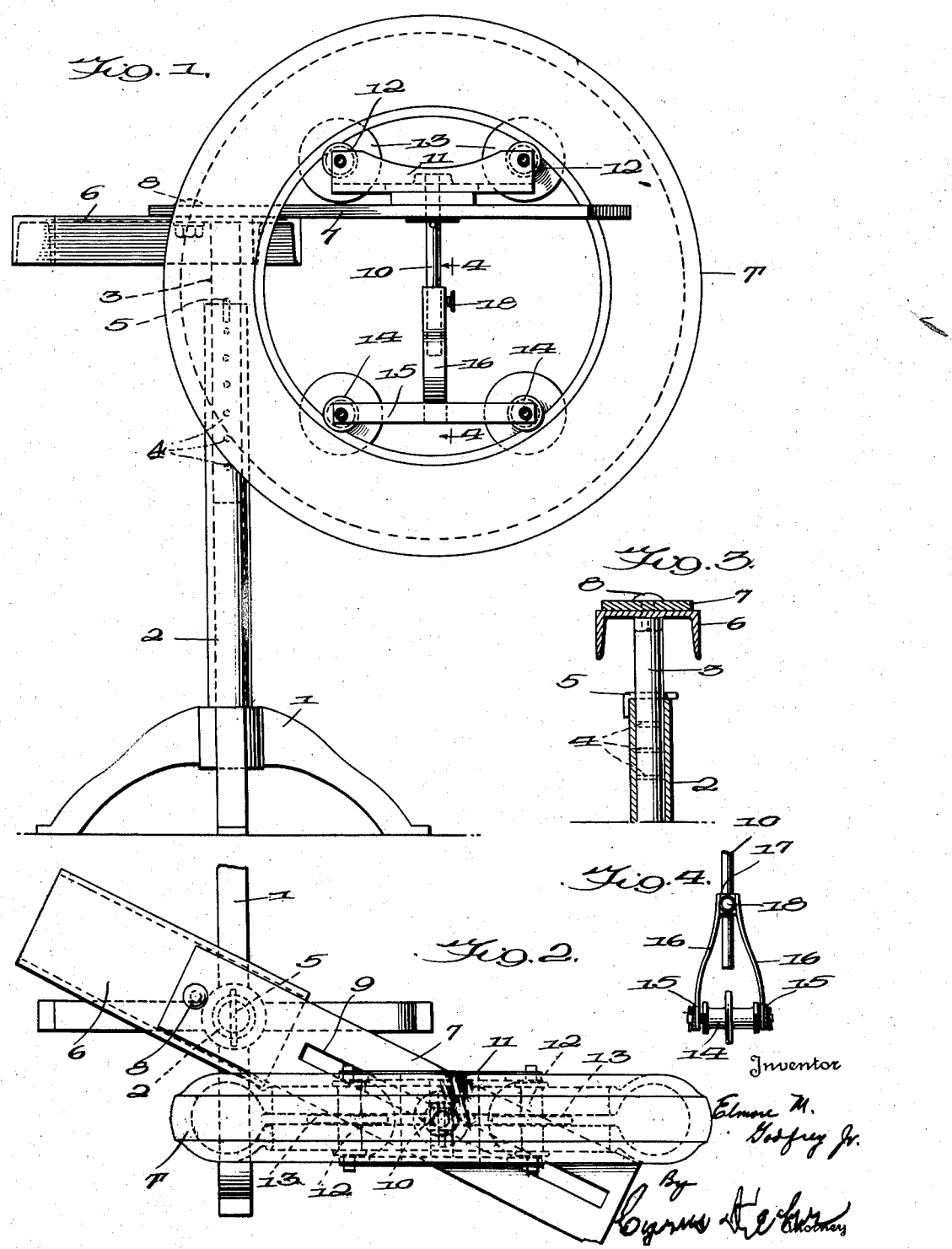

June 29, 1937.    E. M. GODFREY, JR    2,085,650
TIRE BUFFING STAND
Filed May 27, 1935    2 Sheets-Sheet 2
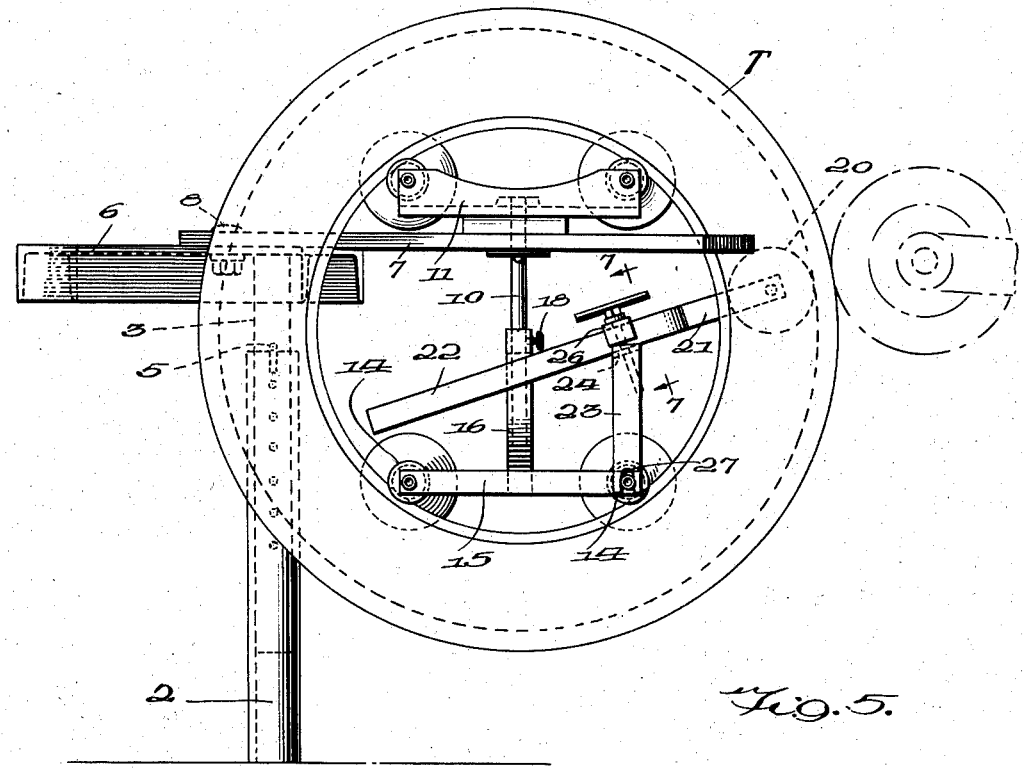
Fig. 5.
Fig. 6.
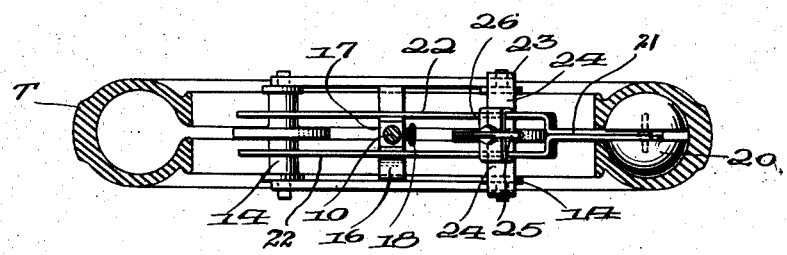
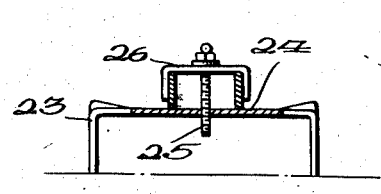
Fig. 7.
Inventor
Elmore M. Godfrey Jr.
By Patented June 29, 1937

2,085,650

UNITED STATES PATENT OFFICE 2,085,650

TIRE BUFFING STAND

Elmore M. Godfrey, Jr., Knoxville, Tenn.

Application May 27, 1935, Serial No. 23,769

10 Claims. (Cl. 51—236)

This invention relates to an improvement in tire buffing stands of the type employed for supporting a pneumatic tire, such as is normally used on an automobile, during abrading of the peripheral surface of the tire to grind away the worn tread thereof, as for retreading.

The object of the invention is to provide a secure support for the tire which may be adjusted as to height and position relative to the abrading machine, and to support the tire for movement toward or from the abrading machine or for rotation relative thereto, these movements and adjustments being effected by a simple and yet standard and secure stand.

A further object of the invention is to provide for supporting the interior of the tire on its inside opposite the point of abrading for the purpose of holding the wall of the tire firmly against the abrading wheel. This is particularly applicable to tires of small size in which the walls are thinner than of larger tires. When they are pressed against the abrading wheel, there is a tendency for them to buckle but this invention supports the wall of the tire firmly from the inside and thereby expedites the buffing operation.

I have illustrated in the accompanying drawings a preferred embodiment of my invention in which Fig. 1 is a side elevation of the stand showing a tire in place thereon;

Fig. 2 is a top plan view thereof;

Fig. 3 is a vertical sectional view through the upper portion of the standard and through the bracket and arm, showing the manner of support thereof;

Fig. 4 is a detail elevation partly in section on the line 4—4, of Fig. 1;

Fig. 5 is a side elevation of the upper portion of the stand showing the attachment for holding the wall of the tire;

Fig. 6 is a horizontal sectional view therethrough; and

Fig. 7 is a detail sectional view on the line 7—7, of Fig. 5.

Referring to Fig. 1 of the drawings, the buffing stand is supported on a base 1, having a tubular standard 2, extending outwardly therefrom with a support 3 telescoped in the upper end thereof for vertical sliding movement adjustably relative to the standard 2. In order to hold the support 3 in adjusted position relative to the standard 2, the former is provided with a series of transverse holes 4, into one of which a pin 5 is removably inserted and bears upon the upper end of the standard 2 to support the principal parts of the stand thereon. The support 3 is free to turn in the standard 2 for adjustment of the supporting portion of the stand to different positions relative to the base and standard.

Secured to the upper end of the support 3, is a bracket 6 which extends horizontally and has an arm 7 connected therewith by a bolt 8. The arm 7 extends horizontally from the bracket 6, and is provided with a longitudinally extending slot 9 therein, as shown in Fig. 2, receiving an upright rod 10 which slides loosely in the slot 9, guiding the sliding movement of the rod longitudinally of the arm and permitting turning of the rod relative to the arm.

The upper end of the rod 10 has a saddle 11 fixed thereto. Journaled in the saddle are a pair of horizontal spaced flanged rollers 12, each having a central flange 13, as shown in Figs. 2 and 6, which enters between the edges of the tire to guide the turning movement thereof on the stand. The tire designated T in the drawings, has its inner sides riding upon the rollers 12 and supported thereby.

In order to guide the lower portion of the tire at its inner edge, flanged guide rollers 14 are provided against which the lower portion of the tire readily bears. The rollers 14 which are similar to the rollers 12 are journaled in a frame having horizontal arms 15, and vertical arms 16, the rollers 14 being journaled in the outer ends of the horizontal arms 15, while said horizontal arms are carried by the lower ends of the vertical arms 16, being attached thereto intermediate their ends, as shown in Figs. 1 and 4. The upper ends of the vertical arms 16 of the frame have a socket 17 therebetween slidably receiving the lower end portion of the rod 10 and is clamped to the rod by means of a thumb screw 18. This permits adjustment of the frame carrying the rollers 14 up or down on the rod 10 to accommodate tires of different diameters.

This construction provides a secure support for the tire during abrading thereof, as by buffing off the worn tread surface to permit renewal or retreading of said surface, and the construction is readily and easily adjustable to accommodate tires of different diameters and to permit sliding movement of the tire toward or from the buffing wheel.

In abrading or buffing tires of smaller diameter, particularly in which the side walls thereof are usually less rigid than larger tires, my invention contemplates the use of an attachment which may be easily and conveniently applied to the buffing stand in order to support the inside of the tire opposite the abrading wheel during the buffing operation to prevent the wall from buckling and to hold it firmly against the abrading wheel. This attachment is illustrated in Figs. 5, 6, and 7 of the drawings, and may be easily applied to or removed from the buffing stand.

A revolving ball 20 is formed of two parts, as shown in Fig. 6, journaled on opposite sides of an arm 21 for freedom of rotation relative thereto, as the tire is turned to bring different parts of the surface thereof opposite the abrading device. The arm 21 terminates in side members 22, which straddle the upward portion of the side bars 16, as shown in Fig. 6, so as to be guided and held against lateral displacement thereby. A yoke 23 has its top portion 24 turned slightly out of horizontal position so as to fit under the side members 22 and is threaded to receive a hand screw 25, which also extends through a clamp 26 that overlies the side members 22, in order to clamp the side members to the yoke 23. The lower end of the yoke 23 is notched as at 27 to straddle the protruding ends of the rollers 14 outside the side bars 15, as shown in Fig. 5, in order to hold the attachment in place thereby, but to permit ready removal of the attachment when desired. The clamp 26 and screw 25 permit adjustment of the ball 20 outwardly or inwardly as may be desired, in order to fit any tire.

The invention may be used in connection with any suitable or desired abrading machine, such as is ordinarily used for instance in buffing off the tread of a tire.

I claim:

1. A tire buffing stand comprising a support, an arm carried thereby provided with a longitudinally extending slot therein, a rod extending upwardly through said slot, means attached to the upper end portion of said rod and carrying a tire engaging member, and a tire engaging member carried by the rod below the arm.

2. A tire buffing stand comprising a support, a horizontal arm carried thereby and provided with a longitudinally extending slot therein, a rod extending upwardly loosely through said slot, a saddle attached to the upper end portion of the rod and carrying a tire engaging member, and means carried by the rod below the arm and carrying a tire engaging member.

3. A tire buffing stand comprising a support, a horizontal arm carried thereby and provided with a longitudinally extending slot therein, a rod extending upwardly loosely through said slot, a saddle attached to the upper end of the rod and carrying a tire engaging roller, and means carried by the rod below the arm and carrying a tire engaging roller.

4. A tire buffing stand comprising a support, a horizontal arm carried thereby and provided with a longitudinally extending slot therein, a rod extending upwardly loosely through said slot and freely slidable longitudinally of said arm, a saddle attached to the upper end of the rod and bearing upon the arm supporting the rod thereby, said saddle carrying a tire engaging roller, and means adjustably attached to the lower portion of the rod below the arm and carrying a tire engaging roller.

5. A tire buffing stand comprising a support, a horizontal arm carried thereby and provided with a longitudinally extending slot therein, a rod extending upwardly loosely through said slot and freely slidable longitudinally of said arm, a saddle attached to the upper end of the rod and bearing upon the arm supporting the rod thereby, said saddle carrying spaced tire engaging rollers, and means adjustably attached to the lower portion of the rod below the arm and carrying spaced tire engaging rollers.

6. A tire support comprising a rod constructed for extending diametrically across a tire within the lateral confines of the tire, a saddle attached to one end portion of the rod and carrying a tire-engaging roller, and means adjustably carried by the other end portion of the rod and carrying a tire-engaging roller, said tire-engaging rollers being arranged to engage the inner edge portion of the tire.

7. A tire support comprising a rod constructed for extending diametrically across the tire within the lateral confines of the tire, a saddle attached to one end portion of the rod and carrying spaced tire-engaging rollers arranged to engage opposite sides of the tire, and means adjustably carried by the other end portion of the rod and carrying spaced tire-engaging rollers arranged to engage opposite sides of the tire, said tire-engaging rollers being arranged to engage the inner edge portions of the tire.

8. A tire support comprising a rod adapted to extend diametrically across the tire, a roller carried by one end portion of the rod and arranged to bridge the beads of the tire, and a roller carried by the opposite end portion of the rod diametrically opposite the first-mentioned roller and arranged to bridge the beads of the tire.

9. In a tire buffing stand, the combination with tire buffing means, of a tire support for holding a tire relative to said buffing means, said tire support comprising an upwardly extending rod extending transversely of the tire, a saddle attached to the upper end portion of the rod and carrying one or more tire engaging rollers arranged to bridge the beads of the tire, and means carried by the lower portion of said rod and arranged to bridge the beads of the tire.

10. In a tire buffing stand, the combination of means for supporting a tire for rotary motion relative to an abrading device, and an attachment for said supporting means including a yoke carried by the supporting means, an arm adjustably secured to the yoke, and a ball journaled at the outer end of the arm in position for supporting the inner wall of the tire at the point of abrading action but held against bodily motion with the tire.

ELMORE M. GODFREY, Jr.